(12) United States Patent
Guo et al.

(10) Patent No.: US 10,200,170 B2
(45) Date of Patent: Feb. 5, 2019

(54) METHOD AND APPARATUS FOR A MULTI-CELL FULL-DIMENSION MIMO SYSTEM

(71) Applicant: Samsung Electronics Co., Ltd, Suwon-si (KR)

(72) Inventors: Li Guo, Allen, TX (US); Boon Loong Ng, Plano, TX (US); Young-Han Nam, Plano, TX (US); Eko Onggosanusi, Coppell, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/430,338

(22) Filed: Feb. 10, 2017

(65) Prior Publication Data

US 2017/0264409 A1 Sep. 14, 2017

Related U.S. Application Data

(60) Provisional application No. 62/408,293, filed on Oct. 14, 2016, provisional application No. 62/305,807, filed on Mar. 9, 2016.

(51) Int. Cl.
*H04L 5/00* (2006.01)
*H04B 7/0413* (2017.01)
(Continued)

(52) U.S. Cl.
CPC ......... *H04L 5/0048* (2013.01); *H04B 7/0413* (2013.01); *H04B 17/345* (2015.01); *H04L 5/0023* (2013.01); *H04L 5/0035* (2013.01); *H04L 5/0073* (2013.01); *H04L 5/0091* (2013.01); *H04W 24/08* (2013.01); *H04W 52/242* (2013.01); *H04W 72/042* (2013.01);
(Continued)

(58) Field of Classification Search
CPC . H04W 72/042; H04W 52/242; H04W 24/08; H04W 52/327; H04W 52/325; H04W 52/247; H04W 52/146
See application file for complete search history.

(56) References Cited

U.S. PATENT DOCUMENTS

2011/0312355 A1   12/2011   Cheng et al.
2013/0242895 A1   9/2013   Chen et al.
(Continued)

OTHER PUBLICATIONS

Petvio; "Considerations on Mitigating Multi-Cell SRS Interference and Increasing SRS Capacity"; 3GPP TSG-RAN WG1 Meeting #59bis; Valencia, Spain; Jan. 18-22, 2010; 4 pages.
(Continued)

*Primary Examiner* — Feben Haile

(57) ABSTRACT

A method for interference reduction of a user equipment (UE) in a wireless communication system. The method comprises receiving, from a base station (BS), configuration information comprising a set of different transmission parameters for cells of a multi-cell full dimension multi-input multi-output (MC FD-MIMO) system, determining a type of sounding reference signal (SRS) based on the configuration information, and transmitting, to the BS, an SRS based on the configuration information over at least one of a predetermined or a configured multi-cell SRS (MC SRS) resources configured by the BS, wherein the SRS includes a set of SRS sequences.

20 Claims, 14 Drawing Sheets

(51) Int. Cl.
*H04W 24/08* (2009.01)
*H04W 52/24* (2009.01)
*H04W 72/04* (2009.01)
*H04B 17/345* (2015.01)
*H04W 52/14* (2009.01)
*H04W 52/32* (2009.01)

(52) U.S. Cl.
CPC ........ *H04W 52/146* (2013.01); *H04W 52/247* (2013.01); *H04W 52/325* (2013.01); *H04W 52/327* (2013.01)

(56) References Cited

U.S. PATENT DOCUMENTS

| | | | |
|---|---|---|---|
| 2016/0050057 A1* | 2/2016 | Kim | H04J 11/0053 370/329 |
| 2016/0127100 A1* | 5/2016 | Xu | H04L 5/0048 370/329 |
| 2018/0062801 A1* | 3/2018 | Zhang | H04L 5/0035 |

OTHER PUBLICATIONS

Alcatel-Lucent et al.; "Summary of SRS Enhancements"; 3GPP TSG-RAN WG1 #60bis; Beijing, China; Apr. 12-16, 2010; 2 pages.
Catt et al.; "Considerations on Increasing SRS Multiplexing"; 3GPP TSG RAN WG1 Meeting #60bis; Beijing, China; Apr. 12-16, 2010; 4 pages.
Foreign Communication from Related Counterpart Application; PCT Application No. PCT/KR2017/002604; Written Opinion of the International Searching Authority dated Jun. 15, 2017; 4 pages.
Foreign Communication from Related Counterpart Application; PCT Application No. PCT/KR2017/002604; International Search Report dated Jun. 15, 2017; 3 pages.
ETSI TS 136 360 V13.0.0 Technical Specification LTE; Evolved Universal Terrestrial Radio Access (E-Utra); LTE-WLAN Aggregation Adaption Protocol (LWAAP) Specification (3GPP TS 36.360 version 13.0.0 (Release 13) (Apr. 2016)—11 Pages.
3GPP TS 36.211 V12.3.0 Technical Specification 3rd Generation Partnership Project; Technical Specification Group Radio Access Network; Evolved Universal Terrestrial Radio Access (E-UTRA); Physical channels and modulation (Release 12) (Sep. 2014)—124 Pages.
3GPP TS 36.212 V12.2.0 (Sep. 2014) Technical Specification 3rd Generation Partnership Project; Technical Specification Group Radio Access Network; Evolved Universal Terrestrial Radio Access (E-UTRA); Multiplexing and channel coding (Release 12) (Sep. 2014) 89 Pages.
ETSI TS 136 213 V12.3.0 Technical Specification LTE; Evolved Universal Terrestrial Radio Access (E-UTRA); Physical layer procedures (3GPP TS 36.213 version 12.3.0 (Release 12) (Oct. 2014)—214 Pages.
3GPP TS 36.216 V12.0.0 Technical Specification 3rd Generation Partnership Project; Evolved Universal Terrestrial Radio Access (E-UTRA); Physical layer for relaying operation (Release 12) (Sep. 2014)—16 Pages.
3GPP TS 36.331 V12.3.0 (Sep. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12)—(Sep. 2014)—378 Pages.

* cited by examiner

METHOD AND APPARATUS FOR A MULTI-CELL FULL-DIMENSION MIMO SYSTEM

The present application claims priority to U.S. Provisional Patent Application Ser. No. 62/305,807, filed on Mar. 9, 2016, entitled "Methods and Apparatus for a Multi-Cell Full-Dimension MIMO System" and U.S. Provisional Patent Application Ser. No. 62/408,293, filed on Oct. 14, 2016, entitled "Methods and Apparatus for a Multi-Cell Full-Dimension MIMO System." The content of the above-identified patent documents are incorporated herein by reference.

TECHNICAL FIELD

The present application relates generally to advanced communication systems. More specifically, this disclosure relates to a multi-cell full-dimension MIMO system.

BACKGROUND

Fifth (5th) generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks should provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, an user equipment (UE) in a wireless communication system is provided. The UE comprises a transceiver configured to receive, from a base station (BS), configuration information comprising a set of different transmission parameters for cells of a multi-cell full dimension multi-input multi-output (MC FD-MIMO) system, and at least one processor configured to determine a type of sounding reference signal (SRS) based on the configuration information, wherein the transceiver is further configured to transmit, to the BS, an SRS based on the configuration information over at least one of a predetermined or a configured multi-cell SRS (MC SRS) resource configured by the BS, the SRS including a set of SRS sequences.

In another embodiment, a base station (BS) in a wireless communication system is provided. The BS comprises at least one processor configured to determine configuration information based on a type of sounding reference signal (SRS) and a transceiver configured to transmit, to a user equipment (UE), the determined configuration information comprising a set of different transmission parameters for each cell of a multi-cell full dimension multi-input multi-output (MC FD-MIMO) system and receive, from the UE, an SRS based on the configuration information over at least one of a predetermined or a configured multi-cell SRS (MC SRS) resource configured by the BS, wherein the SRS includes a set of SRS sequences.

In yet another embodiment, a method for interference reduction of a user equipment (UE) in a wireless communication system is provided. The method comprises receiving, from a base station (BS), configuration information comprising a set of different transmission parameters for cells of a multi-cell full dimension multi-input multi-output (MC FD-MIMO) system, determining a type of sounding reference signal (SRS) based on the configuration information, and transmitting, to the BS, an SRS based on the configuration information over at least one of a predetermined or a configured multi-cell SRS (MC SRS) resources configured by the BS, wherein the SRS includes a set of SRS sequences.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v12.3.0, "E-UTRA, Physical channels and modulation" (REF 1); 3GPP TS 36.212 v12.2.0, "E-UTRA, Multiplexing and Channel coding" (REF 2); 3GPP TS 36.213 v12.3.0, "E-UTRA, Physical Layer Procedures" (REF 3); 3GPP TS 36.216 v12.0.0, "E-UTRA Physical Layer for Relaying Operation" (REF 4); 3GPP TS 36.300 v13.0.0, "E-UTRA and E-UTRAN, Overall Description, Stage 2" (REF 5); and 3GPP TS36.331 v12.3.0, "E-UTRA, Radio Resource Control (RRC) protocol specification" (REF 6).

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access(NOMA), and sparse code multiple access (SCMA) as an advanced access technology have been developed.

Figure 1:
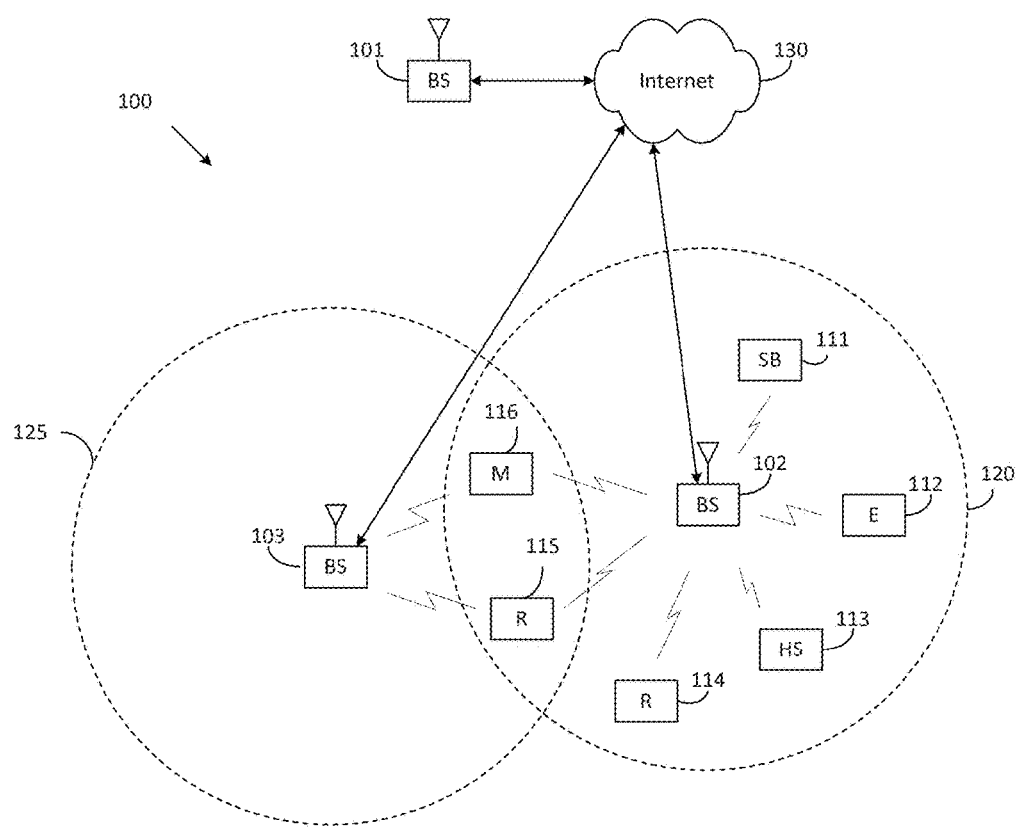
FIG. 1 illustrates an example wireless network according to embodiments of the present disclosure.
Figure 2:
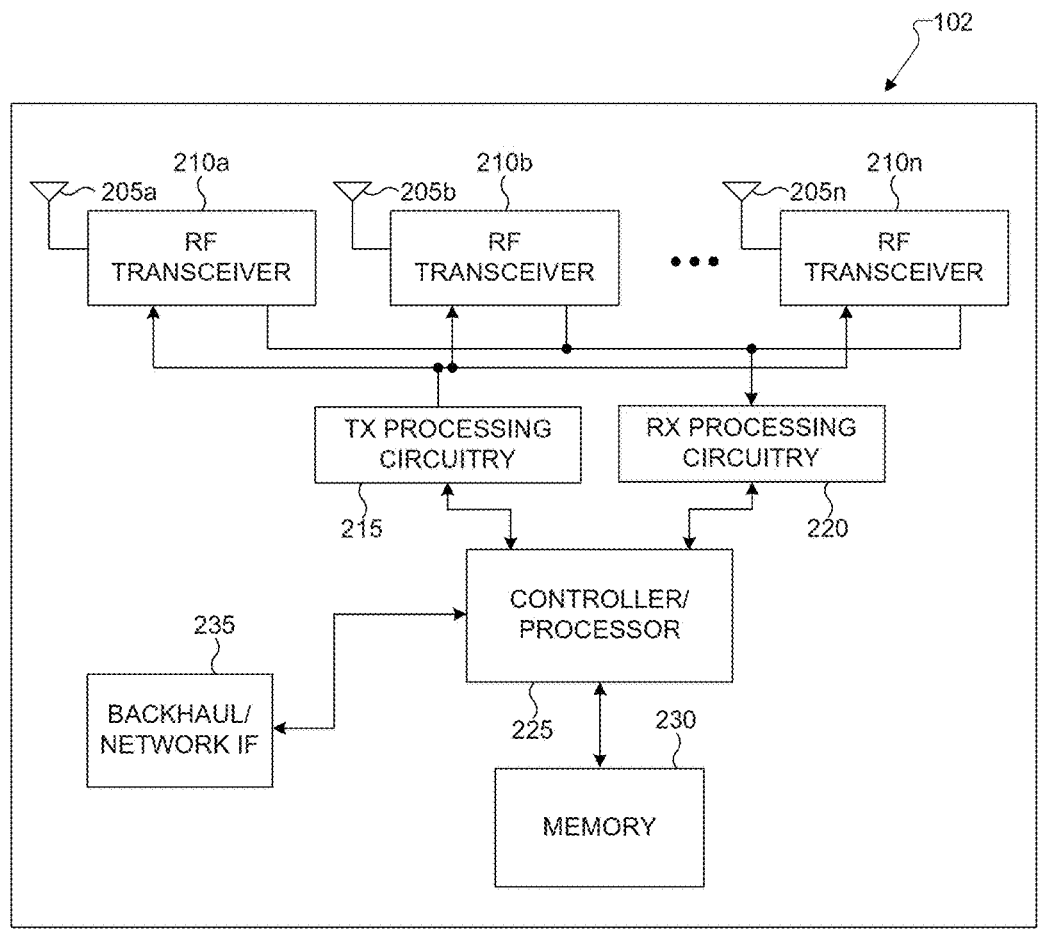
FIG. 2 illustrates an example eNB according to embodiments of the present disclosure.
Figure 3:
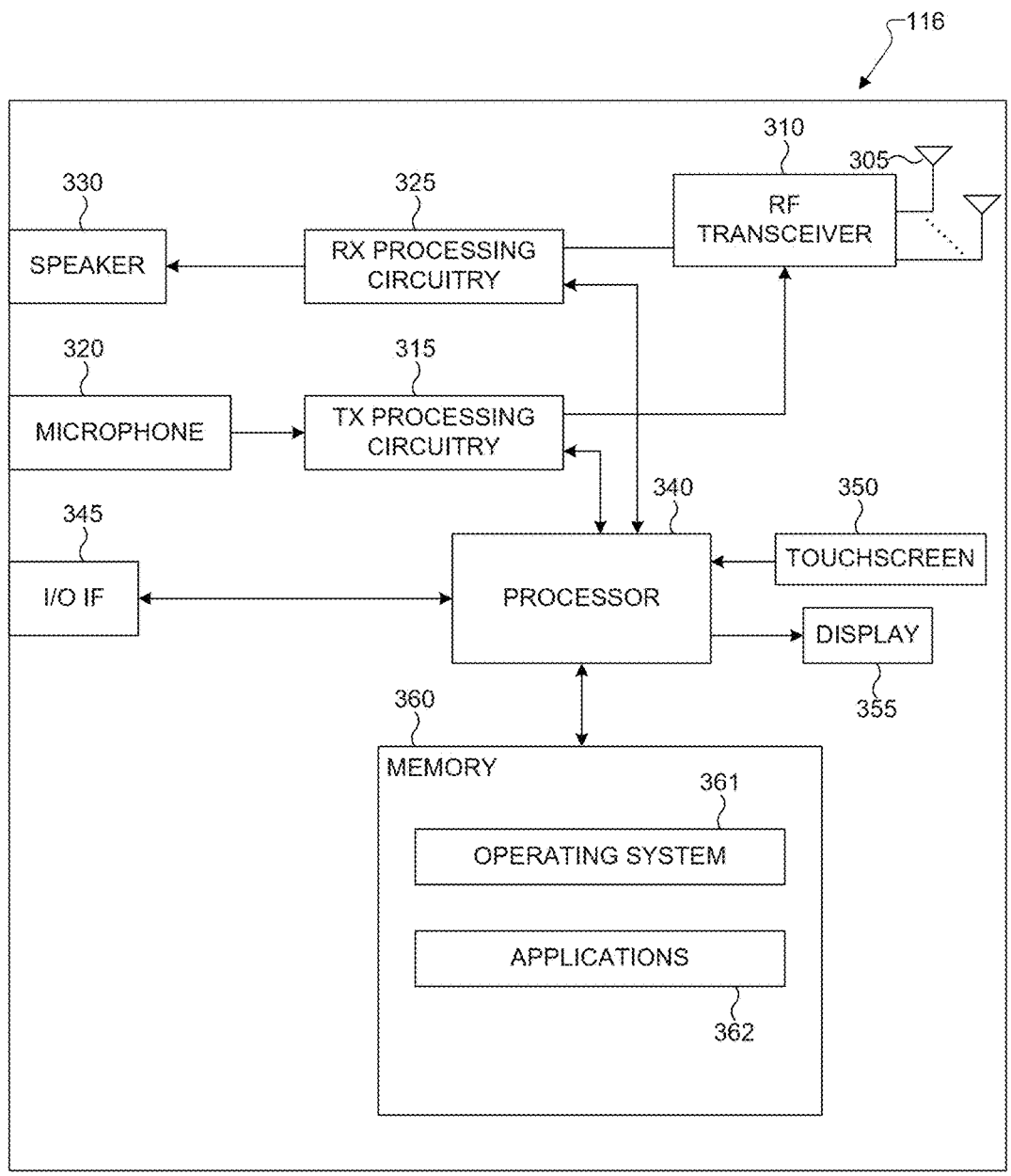
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network shown in FIG. 1 100 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting on PUCCH in an advanced wireless communication system. In certain embodiments, and one or more of the eNBs 101-103 includes circuitry, programming, or a combination thereof, for receiving efficient CSI reporting on PUCCH in an advanced wireless communication system.

Although FIG. 1 illustrates one example of a wireless network 100, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 200 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceiver 210a-201n is also capable of transmitting, to a user equipment (UE), the determined configuration information comprising a set of different transmission parameters for each cell of a multi-cell full dimension multi-input multi-output (MC FD-MIMO) system and receiving, from the UE, an SRS based on the configuration information over at least one of a predetermined or a multi-cell SRS (MC SRS) resource configured by the BS, wherein the SRS includes a set of SRS sequences.

In some embodiments, the RF transceiver 210a-201n is also capable of transmitting cell identification (ID) of at least one aggressor BS in the MC FD-MIMO system and receiving the SRS based on an adjusted timing advance in accordance with average downlink timings transmitted to the UE from neighbor BSs and at least one aggressor in the MC FD-MIMO system.

In some embodiments, the RF transceiver 210a-201n is also capable of transmitting a control message including at least one of a list of BSs, a threshold, and an indicator indicating an MC FD-MIMO operation and receiving a list of aggressor BSs and a ratio based on measured total signal powers of signals transmitted from the BSs included in the list of BSs and non-serving BSs.

In some embodiments, the RF transceiver 210a-201n is also capable of transmitting the determined type of SRS to the UE and receiving channel state information (CSI) measured based on the determined type of SRS.

In some embodiments, the RF transceiver 210a-201n is also capable of transmitting the cell-specific SRS to at least one UE in the cell. In such embodiments, the configuration information comprises at least one of the type of SRS, an orthogonal frequency division multiplexing (OFDM) numerology, a length of cyclic prefix (CP), power control information, or a timing advance. In some embodiments, the RF transceiver 210a-201n is also capable of receiving the configuration information comprising a UE-specific SRS configuration and MC SRS resource configuration and transmitting the SRS based on the UE-specific RS configuration on at least one of the predetermined or the configured MC SRS resources.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

In some embodiments, the controller/processor 225 includes at least one microprocessor or microcontroller. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

In some embodiments, the controller/processor 225 is also capable of determining configuration information based on a type of sounding reference signal (SRS).

In some embodiments, the controller/processor 225 is also capable of determining a type of SRS comprising at least one of an MC SRS, a cell-specific SRS, or a UE specific SRS based on the type of SRS.

In some embodiments, the controller/processor 225 is also capable of calculating an FD-MIMO precoder based on the received CSI using multi-cell signal to noise and leakage ratio (MC-SNLR) algorithm and determining the FD-MIMO precoder to be used for transmitting a physical downlink shared channel (PDSCH) to the UE.

In some embodiments, the controller/processor 225 is also capable of coordinating at least one neighbor BS to determine a cell-specific SRS configuration including at least one subframe in common use. In some embodiments, the controller/processor 225 is also capable of measuring downlink timings and path loss based on downlink signals received from neighbor BS s and the at least one aggressor BS in the MC FD-MIMO system, calculating an average downlink timing of the measured downlink timings based on a predefined timing offset configured by the BS, and adjusting a timing advance based on the calculated average downlink timing and uplink transmit power based on the measured path loss and a configured power control offset to transmit the SRS.

In some embodiments, the controller/processor 225 is also capable of receiving, from a network node, information to mitigate interference on the MC SRS resources and allocating the MC SRS resources to at least one UE in the cell. In such embodiments, the configuration information comprises at least one of the type of SRS, an orthogonal frequency division multiplexing (OFDM) numerology, a length of cyclic prefix (CP), power control information, or a timing advance.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from a base station (BS), configuration information comprising a set of different transmission parameters for cells of a multi-cell full dimension multi-input multi-output (MC FD-MIMO) system.

In some embodiments, the RF transceiver 310 is capable of transmitting, to the BS, an SRS based on the configuration information over at least one of a predetermined or a multi-cell SRS (MC SRS) resource configured by the BS, the SRS including a set of SRS sequences.

In some embodiments, the RF transceiver 310 is capable of receiving a cell identification (ID) of at least one aggressor BS in the MC FD-MIMO system.

In some embodiments, the RF transceiver 310 is capable of receiving a control message including at least one of a list of BSs, a threshold, and an indicator indicating an MC FD-MIMO operation.

In some embodiments, the RF transceiver 310 is capable of transmitting the list of aggressor BSs and the calculated ratio to the BS if the ratio is greater or equal to the threshold. In such embodiments, the configuration information comprises at least one of the type of SRS, an orthogonal frequency division multiplexing (OFDM) numerology, a length of cyclic prefix (CP), power control information, or a timing advance.

In some embodiments, the RF transceiver 310 is capable of receiving the configuration information comprising a UE-specific SRS configuration and transmitting the SRS based on the UE-specific RS configuration on the predetermined MC SRS resources.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is also capable of determining a type of sounding reference signal (SRS) based on the configuration information.

In some embodiments, the processor 340 is also capable of measuring downlink timings based on downlink signals received from neighbor BS s and the at least one aggressor BS in the MC FD-MIMO system, calculating an average downlink timing of the measured downlink timings based on a predefined timing offset configured by the BS, and adjusting a timing advance based on the calculated average downlink timing and uplink transmit power based on the measured path loss and a configured power control offset to transmit the SRS.

In some embodiments, the processor 340 is also capable of measuring total signal powers based on signals received from the BSs included in the list of BSs and non-serving BSs, calculating a ratio of the measured total signal powers of the BSs included in the list of BSs and the non-serving BSs, and comparing the ratio of the measured total signal powers with the threshold included in the control message.

In some embodiments, the processor 340 is also capable of determining a list of aggressor BSs interfering the UE based on the measured total signal powers from the BSs included in the list of BSs. In such embodiments, the configuration information comprises at least one of the type of SRS, an orthogonal frequency division multiplexing (OFDM) numerology, a length of cyclic prefix (CP), power control information, or a timing advance.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 300 illustrates the UE 116 configured as a mobile telephone or smartphone, UEs could be configured to operate as other types of mobile or stationary devices.

Figure 4A:
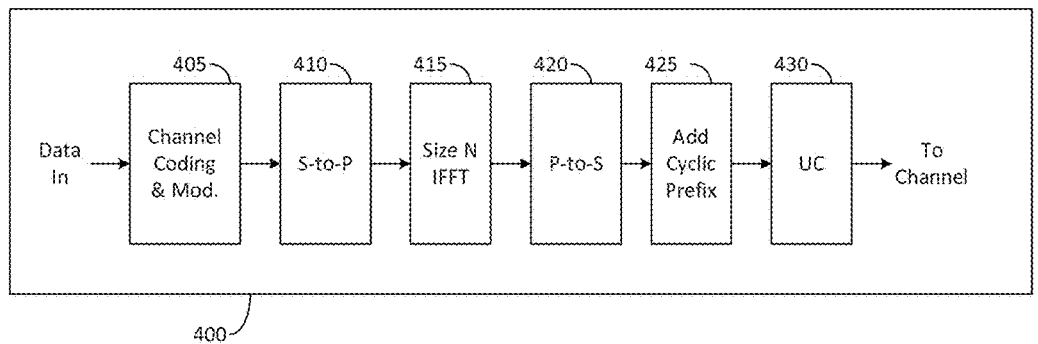
FIG. 4A illustrates a high-level diagram of an orthogonal frequency division multiple access transmit path according to embodiments of the present disclosure.
Figure 4B:
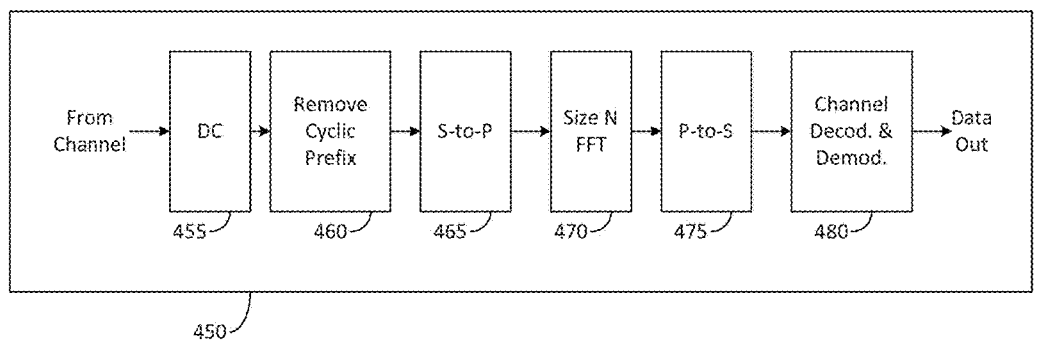
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (e.g. Rel.12) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission scheme wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

It is essential that any cellular communications system is able to transmit in both directions simultaneously. This enables conversations to be made, with either end being able to talk and listen as required. Additionally when exchanging data it is necessary to be able to undertake virtually simultaneous or completely simultaneous communications in both directions. The transmission from UE to eNB is defined as an uplink and the transmission from the eNB to the UE is defined as a downlink. In order to transmit in both uplink and downlink, a UE and eNB have a duplex scheme. There are two forms of duplex scheme that are commonly used, namely frequency division duplexing (FDD) and time division duplex (TDD).

In some embodiments, one wireless communication networks contain multiple transmission points or transmission reception points. Each base station transmission point (BSTP) or transmission reception point (TRP) is equipped with FD-MIMO system antennas. A TP or TRP can provide wireless access services to one or more UEs in its coverage area. For brevity, TP and TRP will be referred to as TP in the current disclosure. The TP transmits radio waveforms on time-frequency resources, which delivers information to one or more UEs in its coverage. One UE receives a desired signal from the UE's serving TP and the UE could also receive signals from other BSs. At one UE, the signal from non-serving BSs could act as interference and degrade the reception quality. In one embodiment, the TP processes the radio waveforms so that signal power level received at those UEs in the coverage area of other BSs is small. Such wireless system is called multi-cell FD-MIMO system. In one such embodiment, a TP corresponds to a base station (BS), or an eNB. In such embodiment, multiple TPs are associated with a BS or an eNB. In one such example, TPs correspond to remote radio heads (RRHs).

Figure 5:
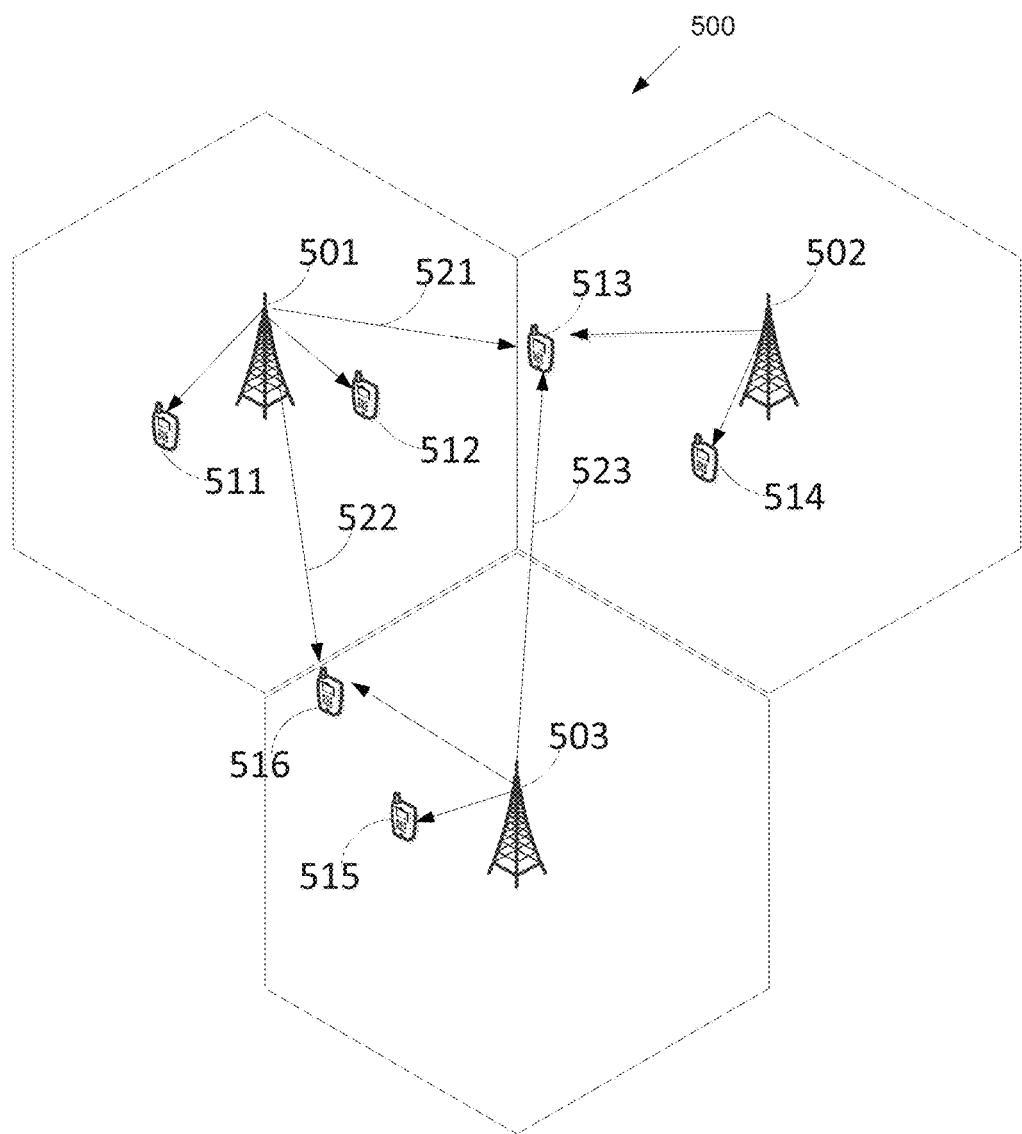
FIG. 5 illustrates an example multi-cell full-dimension-multi-input multi-output (FD-MIMO) system according to embodiments of the present disclosure.

FIG. 5 illustrates an example multi-cell full-dimension-multi-input multi-output (FD-MIMO) system 500 according to embodiments of the present disclosure. The embodiment of the multi-cell FD-MIMO system 500 illustrated in FIG. 5 is for illustration. The multi-cell FD-MIMO system 500 of FIG. 5 could have the same or similar configuration. However, the multi-cell FD-MIMO system 500 comes in a wide variety of configurations, and FIG. 5 does not limit the scope of this disclosure to any particular implementation of the multi-cell FD-MIMO system 500.

Referring to FIG. 5, three TPs (e.g., 501, 502, and 503) are configured with FD-MIMO system. UEs 511 and 512 are in the coverage area of TP 501 and are served by TP 501. UEs 513 and 514 are in the coverage area of TP 502 and are served by TP 502. UEs 515 and 516 are in the coverage area of TP 503 and are served by the TP 503. The TP 501 transmits signal to the UE 511, or to the UE 512 or to the UE 511 and the UE 512. However, the TP 501 formulates the radio signal such that only small power reaches the UE 513 and the UE 516, after passing through a channel link 521 and channel link 522, respectively. The TP 503 transmits signal to the UE 515, or to the UE 516, or to UE 515 and the UE 516. The TP 503 formulates the radio signal such that only small power reaches the UE 513 after passing through a channel link 523.

Figure 6:
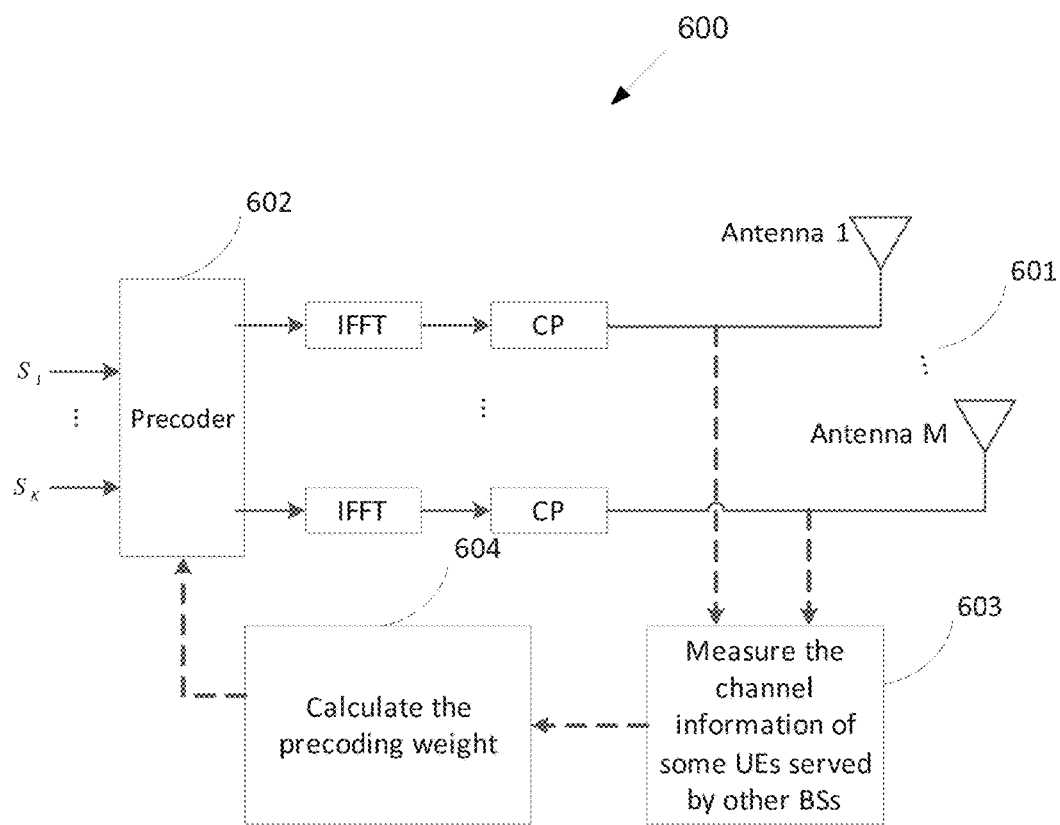
FIG. 6 illustrates an example transmission mechanism of an eNB in a multi-cell FD-MIMO system according to embodiments of the present disclosure.

FIG. 6 illustrates an example transmission mechanism of an eNB in a multi-cell FD-MIMO system 600, as may be performed by the eNB 501 as illustrated in FIG. 5, according to embodiments of the present disclosure. The embodiment of the transmission mechanism of an eNB in a multi-cell FD-MIMO system 600 illustrated in FIG. 6 is for illustration only, and the transmission mechanism of an eNB in a multi-cell FD-MIMO system 600 of FIG. 6 could have the same or similar configuration. However, the transmission mechanism of an eNB in a multi-cell FD-MIMO system 600 comes in a wide variety of configurations, and FIG. 6 does not limit the scope of this disclosure to any particular implementation of the transmission mechanism of an eNB in a multi-cell FD-MIMO system 600.

Referring to FIG. 6, a BS is configured with M antennas 601. K data streams are transmitted by the BS. The transmission is based on orthogonal frequency division multiplexing (OFDM). K data streams in frequency domain first pass through a precoder 602 and are mapped to M sample streams. Each of these M sample streams is converted to time domain through IFFT operation and a CP is inserted. Then, the output of samples is sent to one RF chain and one transmit antenna of 501. One transmit antenna can correspond to a physical antenna element or an array of physical antenna elements.

The precoder 602 is designed specifically so that those M sample streams sent out from M antennas 601 are combined destructively at the reception end of some UEs served by other BSs. The BS first obtains the channel information of some UEs in the coverage area of some other BSs (603). In TDD, the BS could measure some uplink signals from some UEs served by other BSs to obtain the channel information by exploiting channel reciprocity. In FDD, there is no or limited channel reciprocity of downlink and uplink transmission.

In some embodiments, a scheme to employ the uplink transmission to measure the downlink channel in FDD system is to first extract the radio channel information from uplink transmission and then synthesize the downlink channel based on extracted radio channel information. In some embodiments, a scheme for FDD is for the BS to request some UEs served by other BSs to measure the downlink channel information of the BS and then feedback those information to the BS.

Referring to FIG. 6, the BS determines the precoder (604). Assume the BS wants to reduce the interference to P UEs that are in the coverage area of other BSs, and the channel information for each of these P UE is:

$$\vec{g_p} = \begin{bmatrix} g_{p,1} \\ g_{p,2} \\ \vdots \\ g_{p,M} \end{bmatrix} \text{ where } p = 1, 2, \ldots, P.$$

Denote the channel information for K data streams which the BS transmits to its desired UEs as:

$$\vec{h_k} = \begin{bmatrix} h_{k,1} \\ h_{k,2} \\ \vdots \\ h_{k,M} \end{bmatrix} \text{ where } k = 1, 2, \ldots, K.$$

Those K data streams may be the data streams sent to multiple UEs or they could also be the multiple layers of data streams sent to one UE. One scheme to calculate the precoder is a multi-cell signal-to-leakage-and-noise-ratio (SLNR) scheme. The precoding weight for data stream k is calculated by maximizing the ratio of signal to intra-data stream leakage/leakage to target UEs and noise:

$$\vec{W_k} = \arg\max_{\vec{w}} \frac{|\vec{w}^H \vec{h_k}|^2}{\sum_{l=1, l \neq k}^{K} |\vec{w}^H \vec{h_l}|^2 + \sigma^2 + \sum_{p=1}^{P} \beta_p |\vec{w}^H \vec{g_p}|^2} \text{ and the}$$

$$\text{solution is } \vec{W_k} = \left( \sum_{l=1}^{K} \vec{h_l}\vec{h_l}^H + \sigma^2 I + \sum_{p=1}^{P} \vec{g_p}\vec{g_p}^H \beta_p \right)^{-1} \vec{h_k}$$

where $\beta_p$ is the weighting-factor for each target UEs.

It could be determined that how much the BS suppresses the interference to one target UE by adjusting the value $\beta_p$.

In such equations, |.| denotes the absolute value of one complex number, H denotes the Hermitian transpose of one complex vector and I denotes an M×M identity matrix. In the above equations, $\sigma^2$ denotes the power of thermal noise.

In one embodiment, a scheme to calculate the precoding weight is based on the zero-forcing principle. For example, to null multi-user interference to UEs served by other BSs, every precoding weight $\vec{W_k}$ may be some vector that lies in the null space of $\{\vec{g_1}, \vec{g_2}, \ldots, \vec{g_P}\}$.

The BS needs to obtain the information of $\vec{h}_i, i=1,2,\ldots K$ and $\vec{g}_p, p=1,2,\ldots P$. One way to obtain such information is that BS measures the SRS or other UL physical signals sent by serving UEs and by some inter-cell UEs (defined to be UEs served by other cells). The BS can either measure or estimate the value of each $\vec{g}_p, p=1,2,\ldots P$ or obtain the covariance matrix of those inter-cell UEs $\Sigma_{p=1}^{P} \vec{g_p}\vec{g_p}^H$. This is suitable for TDD systems.

In one embodiment, a scheme way to obtain such information is that the UE measures downlink channel information of its serving BS and some neighbor cells, and feedback those channel measurement to the system. This is suitable for FDD systems. A inter-cell UE p can either measure or estimate $\vec{g}_p$, or the covariance matrix $\vec{g_p}\vec{g_p}^H$, which is then reported to its serving BS and the serving BS can further forward the information to corresponding inter-cell BS. The UE could report the measured information to the serving BS and system by some format. One example of the UE feedback format is direct quantization of the channel information, which is called explicit channel feedback. In one embodiment, the UE feedback format is code-book based CSI feedback.

To enable the BS to obtain channel information of some inter-cell UEs, one or more UEs from all inter-cell UEs as victim UEs and their corresponding aggressor BS are selected. In case of TDD, a multi-cell SRS resource is configured to those UEs so that the victim UE could transmit SRS that are detected by the UE's aggressor BSs, according to the configured multi-cell SRS resource. In case of FDD system, the victim UE is configured to measure the downlink channel of the UE's aggressor BSs and feedback the multi-cell channel measurement of the aggressor BS to the system. It is noted that other UL physical signal than the SRS can also be used without departing from the spirit and scope of the invention.

In some embodiments, a SRS resource design for multi-cell FD-MIMO in TDD case is considered. The SRS is called multi-cell SRS. Multi-cell SRS is used by victim UE to transmit sounding signals that are aimed to be detected and measured by the UE's aggressor BSs.

At the viewpoint of one victim UE, there could be one or more aggressor BSs. When there is more than one aggressor BSs for one victim UE, the UE could send just sounding signal on one multi-cell SRS and the UE's all aggressor BSs detect from the same resource. The UE could also be configured with multiple multi-cell SRS resources and the sounding signal transmitted on one resource is detected and measured by one or some of this UE's aggressor BSs. At the viewpoint of one BS, the BS could be the aggressor BS to one or more than one victim UEs. The BS needs to detect and measure the SRS from all victim UEs belong to the BS.

The configuration of one multi-cell SRS resource is for one victim UE-aggressor BS pair. The multi-cell SRS configuration for one victim UE-aggressor BS pair may be informed to the corresponding UE and the aggressor BS. The multi-cell SRS can be configured to the UE by higher layer signaling (e.g. RRC) and includes one or more of the following information: multi-cell SRS bandwidth; multi-cell SRS subframe periodicity and subframe offset (SRS configuration index); multi-cell SRS transmission comb; multi-cell SRS cyclic shift; (optional) multi-cell SRS hopping bandwidth (for sub-band transmission); and (optional) multi-cell SRS frequency domain position (for sub-band transmission).

The timing advance used by one victim for one multi-cell SRS transmission needs special design. The timing advance used for multi-cell SRS to one aggressor BS could be different from the timing advance for the serving BS. One victim UE could send multiple multi-cell SRS aiming to multiple aggressor BSs. The UE could use particular timing advance for each multi-cell SRS transmission. The serving BS could configure the UE that is a victim UE to some aggressor BSs to measure the timing advance of this UE's aggressor BSs.

In one example, one BS could signal its UEs to use the same timing advance for the multi-cell SRS transmission as that used for the serving cell. In another example, one BS could also signal its multi-cell UEs to use different timing advance for multi-cell SRS transmission as that used for the serving cell. The BS signals one multi-cell UE the indices of the aggressor BSs that this UE may derive and compensate the timing advance to. When configured to apply different timing advance for the multi-cell SRS transmission, the UE would do corresponding measurement and determine the UE's timing advance for multi-cell SRS transmission. In yet another example, the UE measures the DL timings of all the neighbor BSs signaled by the serving BS (e.g. from the synchronization signals or cell-specific reference signals), computes the average DL timing, and apply a predefined or configured timing offset with respect to the average DL timing. In yet another example, the UE measures the DL timings of the neighbor BSs (signaled by the serving BS) with received signal strength (e.g. from the synchronization signals or cell-specific reference signals) that is above a predefined or configured threshold (by the serving BS), computes the average DL timing, and apply a predefined or configured timing offset with respect to the average DL timing.

The UE could also report the timing advance measurement for multi-cell SRS to the serving BS and the system determines which UEs are multiplexed into the same OFDM for multi-cell SRS transmission. One example is to multiplex the UEs that are victim UEs to the same aggressor BSs and transmit multi-cell SRS to the same aggressor BS into the same OFDM symbol. The advantage is that the number of multi-cell SRS symbols that the aggressor BS needs to detect and/or measure can be minimized. In addition, the serving BS ensures that the relative timing advance differences of UEs to be multiplexed is within a threshold such that the aggressor BS can reliably detect/measure the multi-cell SRS multiplexed in the same symbol. In one example, the timing advance measurement is defined to be the multi-cell SRS transmission timing with respect to the measured DL timing of the aggressor BS. In another example, the timing advance measurement is defined to be the measured DL timing of the aggressor BS.

To allow better control of timing advance for multi-cell SRS, there can be a separate timing advance command for multi-cell SRS transmission which is signaled by the serving BS to the multi-cell UE. For example, a first type of timing advance command is for conventional UL transmissions or UL transmissions for the serving BS, and a second type of timing advance command is for multi-cell SRS transmission. The type of timing advance command can be indicated to the UE in the header or the message of medium access control (MAC) control element for timing advance.

Figure 7:
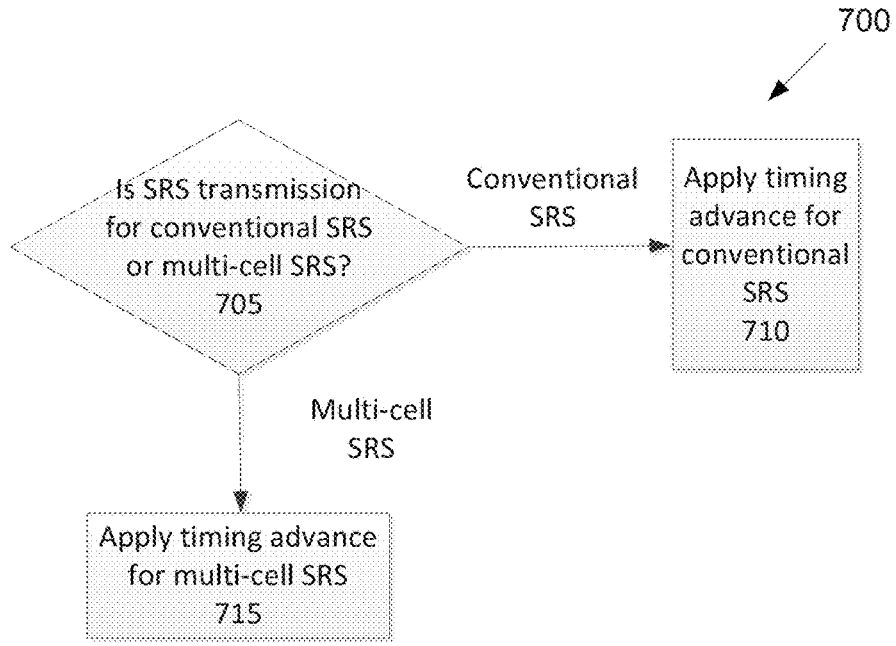
FIG. 7 illustrates an example uplink (UL) timing advance procedure for a UE configured with multi-cell sounding reference signal (SRS) according to embodiments of the present disclosure.

FIG. 7 illustrates an example uplink (UL) timing advance procedure for a UE configured with multi-cell sounding reference signal (SRS) 700 according to embodiments of the present disclosure. The embodiment of UL timing advance procedure for the UE configured with multi-cell SRS 700 illustrated in FIG. 7 is for illustration only, and the UL timing advance procedure for the UE configured with multi-cell 700 of FIG. 7 could have the same or similar configuration. However, the UL timing advance procedure for the UE configured with multi-cell SRS 700 comes in a wide variety of configurations, and FIG. 7 does not limit the scope of this disclosure to any particular implementation of the UL timing advance procedure for the UE configured with multi-cell 700.

As illustrated in FIG. 7, the UE selects the timing advance based on the SRS transmission type. If the SRS transmission is for conventional SRS, the UE applies the timing advance for conventional SRS, for example, the timing advance for the serving cell. If the SRS transmission is for multi-cell SRS, the UE applies the timing advance for multi-cell SRS, for example, the timing advance measured from one or more than one aggressor BSs.

As illustrated in FIG. 7, the UE determines whether the SRS transmission is for conventional SRS or multi-cell SRS at step 705. If the UE determines the RSR transmission is the conventional SRS, the UE applies timing advance for the conventional SRS at step 710. Otherwise, the UE applies timing advance for the multi-cell SRS at step 715.

The UL power used by UE for multi-cell SRS transmission needs special consideration. In one embodiment, the system defines one UL power density value or UL power value, and signals/configures the system to all the BSs. Then each BS signals this value to the selected multi-cell UEs and the UE may use this value on multi-cell SRS transmission.

In one example, the UL power control signaling for multi-cell SRS is indicated by higher layer (e.g. RRC), and can be reconfigured by higher layer. In another example, the UL power signaling for multi-cell SRS is indicated by dynamic UL power control signaling, e.g. using a dynamic control information (DCI) format with a new TPC-RNTI. The UE configured with multi-cell SRS transmission maintains more than one UL power control loops for SRS transmissions, i.e. one UL power control loop for the conventional SRS transmission and another UL power control loop for the multi-cell SRS transmission.

Figure 8:
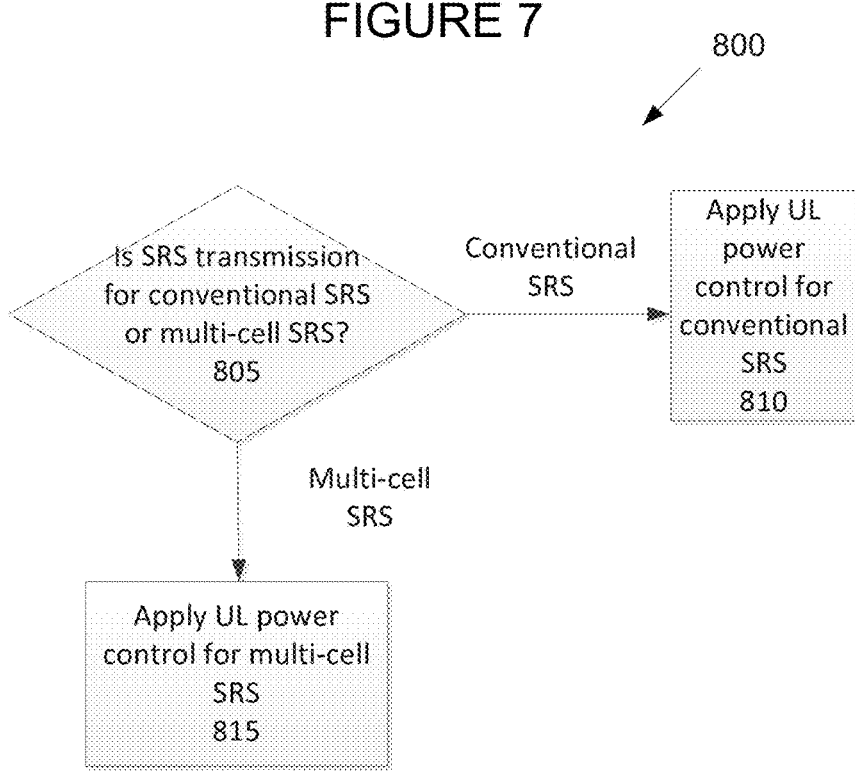
FIG. 8 illustrates an example UL power control procedure for a UE configured with multi-cell SRS according to embodiments of the present disclosure.

FIG. 8 illustrates an example UL power control procedure for UE configured with multi-cell SRS 800 according to embodiments of the present disclosure. The embodiment of the UL power control procedure for UE configured with multi-cell SRS 800 illustrated in FIG. 8 is for illustration only, and the UL power control procedure for UE configured with multi-cell SRS 800 of FIG. 8 could have the same or similar configuration. However, the UL power control procedure for UE configured with multi-cell SRS 800 comes in a wide variety of configurations, and FIG. 8 does not limit the scope of this disclosure to any particular implementation of the UL power control procedure for UE configured with multi-cell SRS 800.

As illustrated in FIG. 8, the UE selects the UL power based on the SRS transmission type, for example, the UE determines whether SRS transmission is for conventional SRS or multi-cell SRS at step 805. If the SRS transmission is for conventional SRS, the UE applies the UL power control for the conventional SRS at step 810. If the SRS transmission is for multi-cell SRS, the UE applies the UL power control for the multi-cell SRS at step 815. All the victim UEs being multiplexed on the same multi-cell SRS symbol aimed to the same aggressor BS could use the same SRS transmit power density, which is indicated by some control message from each victim UE's serving BS.

Figure 9:
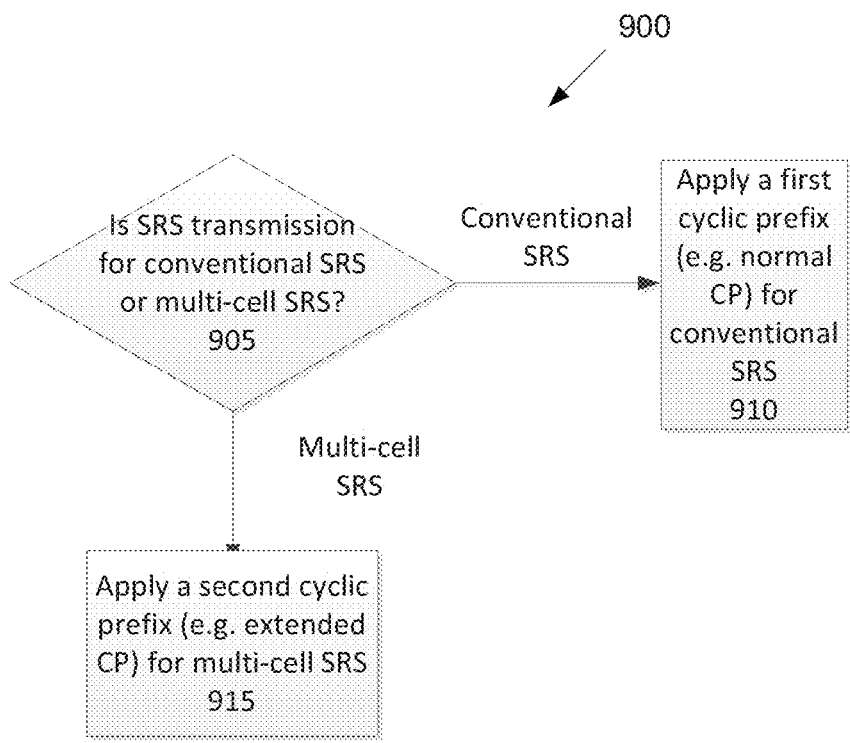
FIG. 9 illustrates an example cyclic prefix (CP) determination for a UE configured with multi-cell SRS according to embodiments of the present disclosure.

FIG. 9 illustrates an example cyclic prefix (CP) determination for UE configured with multi-cell SRS 900 according to embodiments of the present disclosure. The embodiment of the CP determination for UE configured with multi-cell SRS 900 illustrated in FIG. 2 is for illustration only, and the CP determination for UE configured with multi-cell SRS 900 of FIG. 9 could have the same or similar configuration. However, the CP determination for UE configured with multi-cell SRS 900 comes in a wide variety of configurations, and FIG. 9 does not limit the scope of this disclosure to any particular implementation of the CP determination for UE configured with multi-cell SRS 900.

As illustrated in FIG. 9, the UE determines whether SRS transmission is for conventional SRS or multi-cell SRS at step 905. If the UE determines the SRS transmission is for the conventional SRS, the UE applies a first cyclic prefix (e.g., normal CP) and/or a first OFDM subcarrier spacing for the conventional SRS at step 910. If the UE determines the SRS transmission is for the multi-cell SRS, the UE applies a second cyclic prefix (e.g., extended CP) and/or a second OFDM subcarrier spacing for the multi-cell SRS at step 915.

The multi-cell SRS transmitted by one victim UE is aimed to transmit across more than one cell to arrive the aggressor BS. For sufficiently larger cell size, the symbol used for multi-cell SRS may use a longer cyclic prefix than the symbols used for conventional SRS transmission. In one embodiment, the BS signals two cyclic prefix lengths (a first cyclic prefix length and a second cyclic prefix length) to the UE. A first cyclic prefix is for conventional SRS and a second cyclic prefix is for multi-cell SRS transmission. The UE determines the cyclic prefix length based on the SRS transmission, as illustrated in FIG. 9. If the SRS transmission is for conventional SRS, the UE applies a first cyclic prefix length. If the SRS transmission is for multi-cell SRS, the UE applies a second cyclic prefix length. In one option, the cyclic prefix length is indicated by higher layer (e.g., RRC) and can be changed by higher layer. The higher layer also configures that the UE should use different cyclic prefix length for multi-cell SRS transmission or not.

Figure 10:
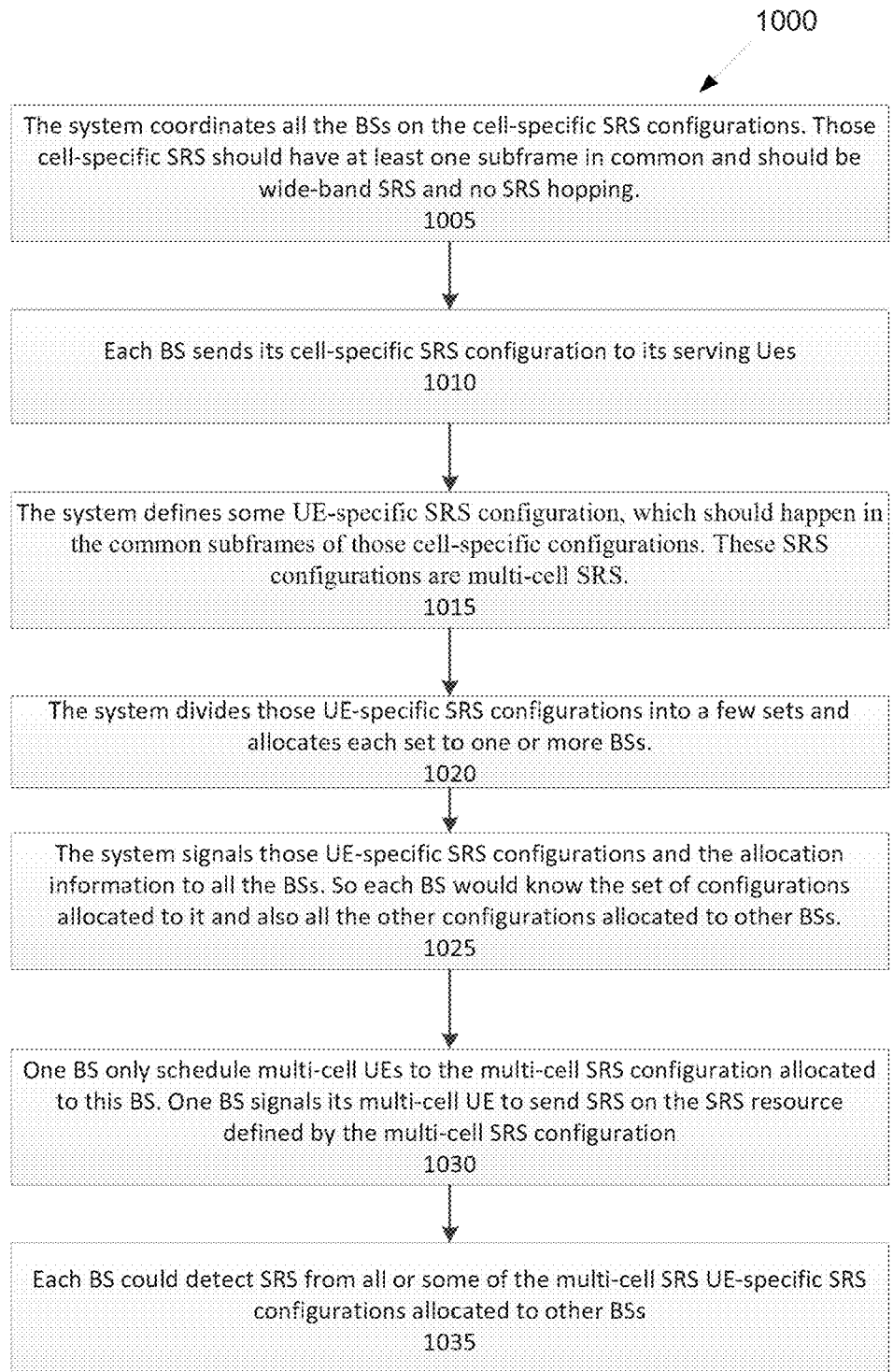
FIG. 10 illustrates an example method of multi-cell SRS operation according to embodiments of the present disclosure.

FIG. 10 illustrates an example method of multi-cell SRS operation 1000 according to embodiments of the present disclosure. The embodiment of the method of multi-cell SRS operation 1000 illustrated in FIG. 10 is for illustration only, and the method of multi-cell SRS operation 1000 of FIG. 10 could have the same or similar configuration. However, the method of multi-cell SRS operation 1000 comes in a wide variety of configurations, and FIG. 10 does not limit the scope of this disclosure to any particular implementation of the method of multi-cell SRS operation 1000.

As illustrated in FIG. 10, the method of multi-cell SRS operation 1000 begins at step 1005, at step 1005, the system coordinates all the BSs on the cell-specific SRS configurations that may have at least one subframe in common and may be wide-band SRS, and no SRS hopping. At step 1010, each of BSs sends the BS's cell-specific SRS configuration to the UEs that are being served by the BS. At step 1015, the system defines some UE-specific SRS configuration, which may happen in the common subframes of those cell-specific configurations, wherein these SRS configurations are multi-cell SRS. At step 1020, the system divides those UE-specific SRS configurations into a few sets and allocates each set to one or more BSs. At step 1025, the system signals those UE-specific SRS configurations and the allocation information to all the BSs. So each BS may know the set of configurations allocated to each BS and also all the other configurations allocated to other BSs. At step 1030, a BS may schedule multi-cell UEs to the multi-cell SRS configuration allocated to the BS. The BS transmits signals to the BS's multi-cell UE in order to send SRS on the SRS resource defined by the multi-cell SRS configuration. Finally, each BS could detect SRS from all or some of the multi-cell SRS UE-specific SRS configurations allocated to other BSs at step 1035.

In one embodiment, the multi-cell SRS according to the LTE specification is implemented, which is illustrated in FIG. 10. In one embodiment, there are cell-specific SRS configuration and UE-specific SRS configuration. The procedure to implement multi-cell SRS is: 1) the system coordinates all the BSs on the cell-specific SRS configuration of each BS. It is required that the SRS subframes defined by cell-specific SRS configuration of all BSs may have at least one subframe in common. It is also required that the cell specific bandwidth configuration should be the wide-band SRS and no SRS hopping; the BS sends the cell-specific SRS configuration in its cell; the system defines $N_{SRS} \times N_{cfg}$ UE-specific SRS configurations. Those SRS configurations may happen in the common subframes of cell-specific configuration. Those SRS configurations are called multi-cell UE-specific SRS configurations; the system partition those SRS configurations into $N_{SRS}$ sets and each set has $N_{cfg}$ configurations. Each set is considered as one multi-cell SRS resource.

Figure 11:
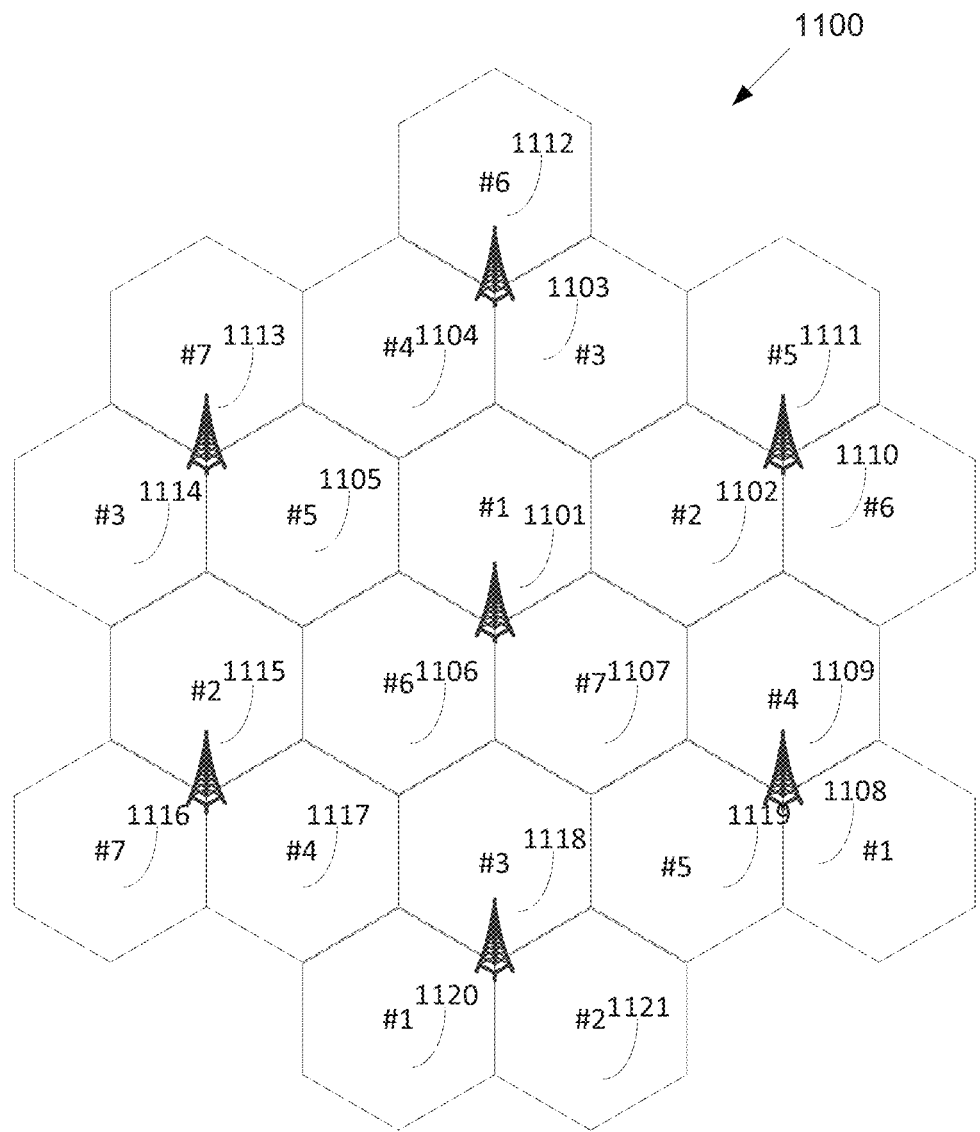
FIG. 11 illustrates an example allocation of multi-cell sounding resource to multiple BSs according to embodiments of the present disclosure.

FIG. 11 illustrates an example allocation of multi-cell sounding resources to multiple BSs 1100 according to embodiments of the present disclosure. The embodiment of the allocation of multi-cell sounding resources to multiple BSs 1100 in FIG. 11 is for illustration only, and the allocation of multi-cell sounding resources to multiple BSs 1100 of FIG. 11 could have the same or similar configuration. However, the allocation of multi-cell sounding resources to multiple BSs 1100 comes in a wide variety of configurations, and FIG. 11 does not limit the scope of this disclosure to any particular implementation of the allocation of multi-cell sounding resources to multiple BSs 1100.

The system allocates those multi-cell SRS resources to BSs, for example, according to the SRS deployment in FIG. 11. In one example, the system signals those $N_{SRS} \times N_{cfg}$ UE-specific SRS configurations to all the BSs and the system also signals each BS the index of set allocated to this BS. In another example, those $N_{SRS} \times N_{cfg}$ UE-specific SRS configurations are not used by any BS for conventional SRS configuration. One BS signals multi-cell UE to send SRS signal on one of those multi-cell UE-specific SRS configurations allocated to this BS. In yet another example, a BS could detect the SRS signal from all or some of those $N_{SRS} \times N_{cfg}$ UE-specific SRS configurations used for multi-cell SRS. To ensure the multi-cell SRS transmission quality, the coordination node can deploy the multi-cell SRS resources over the cellular network to minimize the inter-cell interference on multi-cell SRS transmission. FIG. 11 illustrates an example of allocating multi-cell SRS resources to multiple BSs in a wireless network.

Referring to FIG. 11, one multi-cell SRS resource is allocated to one BS. Multi-cell SRS resource #1 is allocated to cells 1101, 1108 and 1120. Multi-cell SRS resource #2 is allocated to cells 1102, 1115 and 1121. Multi-cell SRS resource #3 is allocated to cells 1103, 1114 and 1118. Multi-cell SRS resource #4 is allocated to cells 1104, 1117 and 1109. Multi-cell SRS resource #5 is allocated to cells 1105, 1111 and 1119. Multi-cell SRS resource #6 is allocated to cells 1106, 1110 and 1112. Multi-cell SRS resource #7 is allocated to cells 1107, 1113 and 1116. During the multi-cell SRS resource #1, only the UEs in cells 1101, 1108 and 1120 transmit sounding signal. All the other BSs could detect the sounding signal from multi-cell SRS resource #1. The similar operation applies to multi-cell SRS resource #2~#7.

Referring to FIG. 11, the multi-cell SRS resource has deployment with re-use factor=7. In this deployment, each BS is able to detect the sounding signals of multi-cell UEs in 6 other BSs. One can achieve deployment with different re-use factor.

Figure 12:
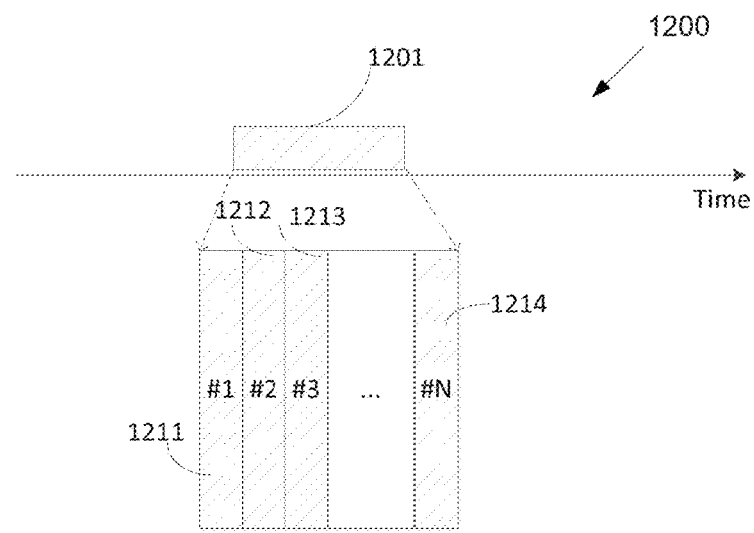
FIG. 12 illustrates an example multi-cell SRS resource according to embodiments of the present disclosure.

FIG. 12 illustrates an example multi-cell SRS resource 1200 according to embodiments of the present disclosure. The embodiment of the multi-cell SRS resource 1200 illustrated in FIG. 12 is for illustration only, and the multi-cell SRS resource 1200 of FIG. 12 could have the same or similar configuration. However, the multi-cell SRS resource 1200 comes in a wide variety of configurations, and FIG. 12 does not limit the scope of this disclosure to any particular implementation of the multi-cell SRS resource 1200.

Referring to FIG. 12, one can partition the frame into $N_{SRS}$ multi-cell SRS resources and thus achieve multi-cell SRS resource deployment with re-use factor=$N_{SRS}$. With larger value of $N_{SRS}$, one BS is able to detect the SRS signals of multi-cell UEs from more cells but with less multi-cell UEs in each cell. With smaller value of $N_{SRS}$, one BS is able to detect the SRS signals of multi-cell UEs from less cells but with more multi-cell UEs in each cell.

Referring to FIG. 12, one uplink frame is defined as multi-cell SRS frame (1201). The multi-cell SRS frame 1201 is divided into N multi-cell SRS resources including a plurality of frames 1211, 1212, 1213, and 1214. Each of resources (e.g., 1211, 1212, 1213, and 1214) contains one or more SRS transmission chances. The multi-cell SRS frame is partitioned into multiple SRS transmission chances. In one example, in each OFDM symbol, divide the subcarriers into a few groups and each group of subcarrier on one OFDM symbol is one SRS chance. In another example, one SRS chance is one signal sequence sent over one or more OFDM symbols. A central coordination node sends the multi-cell SRS resource configuration information to one BS. The configuration information includes: the indices of frames which are configured as multi-cell SRS frame. This information could be the index of starting frame and the periodicity. The system could also use explicit frame number to configure aperiodic multi-cell SRS frame; the information of how one multi-cell SRS frame is partitioned to multiple SRS chances. The partition could be TDM, FDM, FDM or combination of them; and the indices of multi-cell SRS chances allocated to one BS. The index information tells the BS that symbol number, frequency shift index and SRS signal sequence this BS should use for multi-cell SRS transmission.

One BS signals the multi-cell SRS configuration information to UEs: the indices of multi-cell SRS frames; and the index of multi-cell SRS chance one UE should use to send SRS. The index of one multi-cell SRS chance tells the UE the information of symbol index, comb index and SRS code sequence that this UE may use. The multi-cell SRS frame could happen periodically. The BS informs the periodicity information of the multi-cell SRS to UEs through some RRC message. System could also configure aperiodic multi-cell SRS frame. The system signal to all BS that one or more uplink frames is configured as multi-cell SRS and the SRS chance partition configuration. One BS signals this configuration to its serving UEs. One BS signals to multi-cell UE with one multi-cell SRS chance to inform the UE to transmit SRS.

Figure 13:
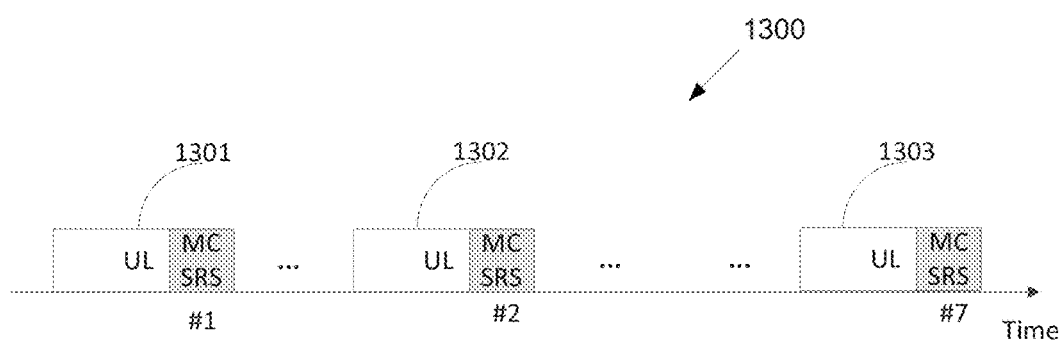
FIG. 13 illustrates another example multi-cell SRS resource according to embodiments of the present disclosure.

FIG. 13 illustrates another example multi-cell SRS resource 1300 according to embodiments of the present disclosure. The embodiment of the multi-cell SRS resource 1300 illustrated in FIG. 13 is for illustration only, and the multi-cell SRS resource 1300 of FIG. 13 could have the same or similar configuration. However, the multi-cell SRS resource 1300 comes in a wide variety of configurations, and FIG. 13 does not limit the scope of this disclosure to any particular implementation of the multi-cell SRS resource 1300.

In some embodiment, the multi-cell SRS resources exist in multiple frames. FIG. 13 illustrates an example of multi-cell SRS resource configuration. Referring to FIG. 13, a few symbols in one or more uplink frames are defined as one multi-cell SRS resource that contains one or more SRS chances. The last few symbols in uplink frame 1301 are defined as multi-cell SRS resource #1. The last few symbols in uplink frame 1302 are defined as multi-cell SRS resource #2 and last few symbols in uplink frame 1303 are defined as multi-cell SRS resource #7.

In some embodiment of the current invention, the UE is configured with two or multiple OFDM numerologies for SRS transmission. The numerology includes the subcarrier spacing, OFDM symbol length and cyclic prefix length of OFDM symbol. In one example, the UE is configured with two different OFDM numerologies for SRS transmission. A first OFDM numerology is used by the UE to transmit SRS for the serving eNB to estimate the channel information between the UE and serving eNB. A second OFDM numerology is used by the UE to transmit SRS for the aggressor eNB(s) to estimate the channel information between the UE and each aggressor eNB.

Figure 14:
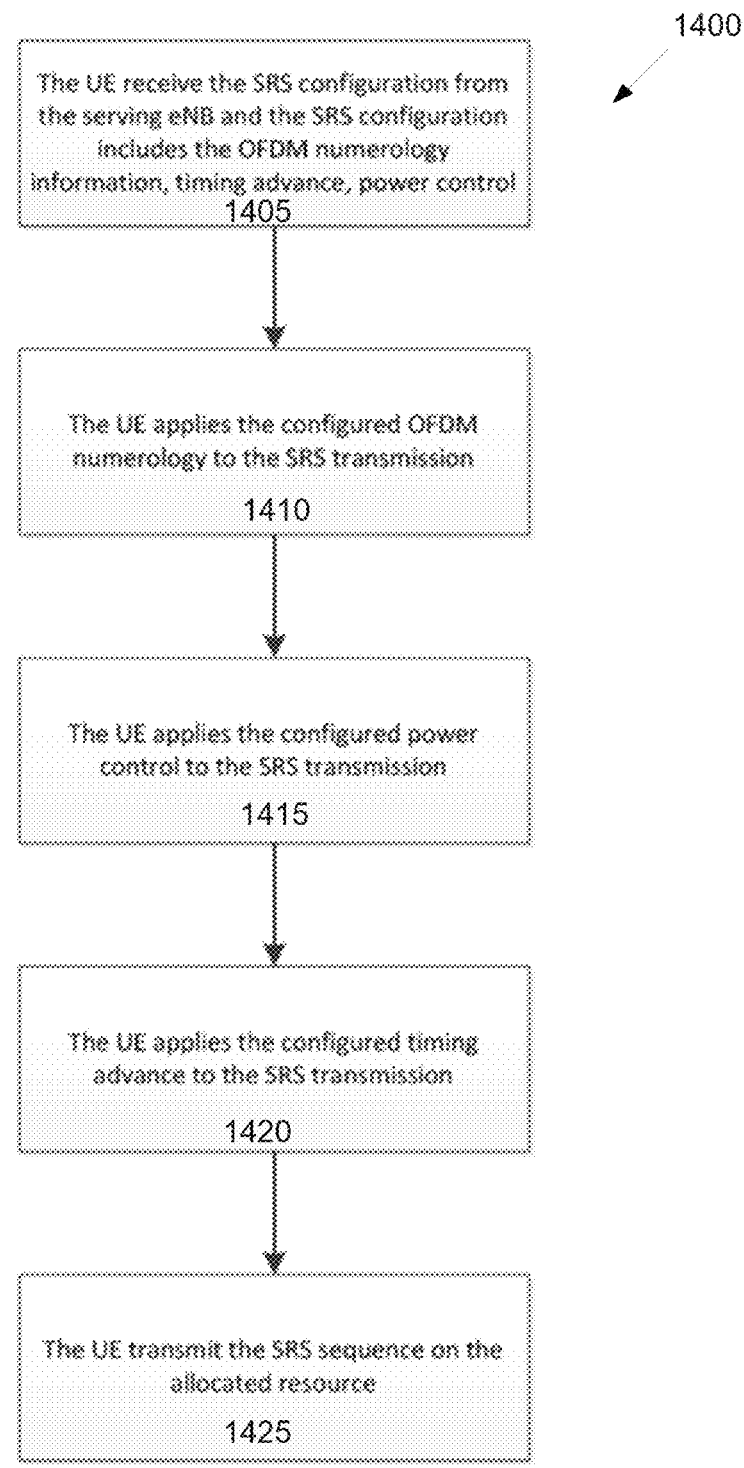
FIG. 14 illustrates an example UE operation according to embodiments of the present disclosure.

FIG. 14 illustrates an example UE operation 1400 according to embodiments of the present disclosure. The embodiment of the UE operation 1400 illustrated in FIG. 14 is for illustration only, and the UE operation 1400 of FIG. 14 could have the same or similar configuration. However, UE operation 1400 comes in a wide variety of configurations, and FIG. 14 does not limit the scope of this disclosure to any particular implementation of the UE operation 1400.

As shown in FIG. 14, the UE receive the SRS configuration from the eNB and the configuration includes the OFDM numerology, power control, and timing advance. Then the UE applies the configured OFDM symbol numerology to the SRS transmission, the UE applies the configured power control to the SRS transmission, and the UE applies the configured timing advance to the SRS transmission. The UE transmits the SRS sequence on the allocated SRS resource.

At step, 1405, the UE receives the SRS configuration from the serving eNB and the SRS configuration includes the OFDM numerology information, timing advance, and power control. The UE, at step 1410, applies the configured OFDM numerology to the SRS transmission. The UE applies the configured power control to the SRS transmission at step 1415. At step 1420, the UE applies the configured timing advance to the SRS transmission. Finally, the UE transmits the SRS sequence on the allocated resource at step 1425.

In some embodiment, one eNB shares the configuration of SRS resources and transmission using one or more than of those OFDM numerologies to another eNBs. One eNB is configured to estimate the channel information from the SRS resources and transmission whose configuration is shared by another eNB.

Figure 15:
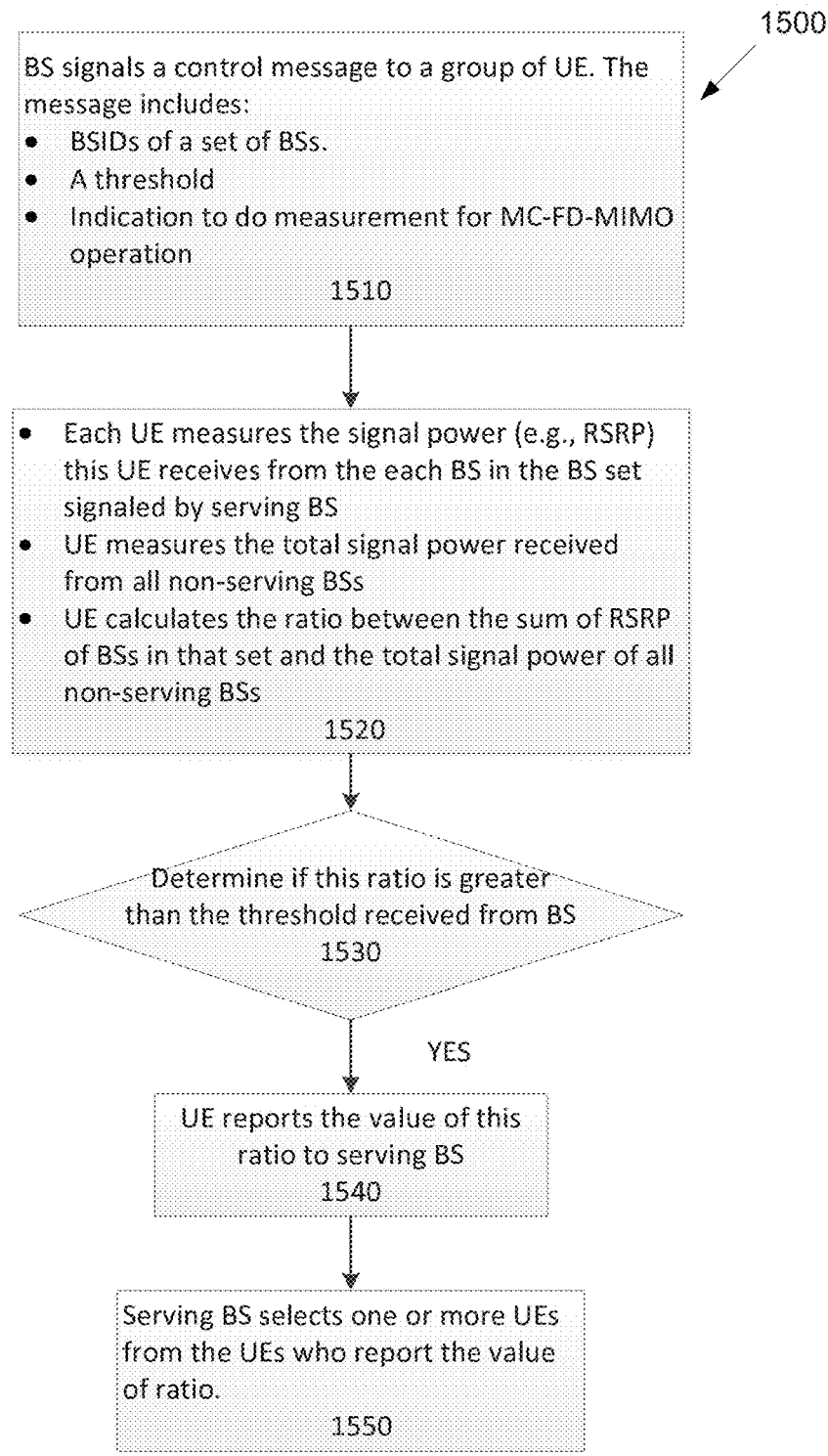
FIG. 15 illustrates an example procedure of selecting multi-cell UEs according to embodiments of the present disclosure.

FIG. 15 illustrates an example procedure of selecting multi-cell UEs 1500 according to embodiments of the present disclosure. The embodiment of the procedure of selecting multi-cell UEs 1500 illustrated in FIG. 15 is for illustration only, and the procedure of selecting multi-cell UEs 1500 of FIG. 15 could have the same or similar configuration. However, the procedure of selecting multi-cell UEs 1500 comes in a wide variety of configurations, and FIG. 15 does not limit the scope of this disclosure to any particular implementation of the procedure of selecting multi-cell UEs 1500.

In some embodiments, one BS can select one or more UEs from all the UEs that are served by this BS for multi-cell FD-MIMO operation. Those selected UEs are called multi-cell UEs. Referring to FIG. 15, at step 1510, a BS (e.g., denoted as A) signals control information to a group of UEs to indicate the UE to perform measure the downlink signal power of target neighbor BSs. The index information of those target neighbor BSs is also signaled to the UEs. The control information includes some or all of the following information: the BS identification numbers of a set of BSs. The BS in this set should be some BS other than the BS A, which is able to operate the multi-cell FD-MIMO operation to the UEs being served by BS A; a threshold value $\lambda$; and indication to UE to conduct the measurement for multi-cell FD-MIMO scheme.

Referring to FIG. 15, at step 1520, each UE measures the signal power it receives from each BS in the set of BSs, which is contained in the control information signaled by serving BS. One example of the signal power is the RSRP of each BS. At step 1520, each UE also measures the total signal power it receives from all the non-serving BSs. This signal power is the interference power level the UE experiences in the downlink transmission. Denote the signal power of BSs in the BS set received in control information as $P_{I,k}$ k=1,2, ..., K, where K is the number of BSs in that set, and denote total signal power of non-serving BS as $P_I$. At step 1520, UE calculate the ratio between the sum of signal power of BSs in the set and the total signal power of non-serving BS:

$$\rho = \frac{\sum_{k=1}^{K} P_{l,k}}{P_l}$$

Referring to FIG. 15, at step 1530, one UE determines if the ratio ρ is greater than the threshold λ. If ρ is greater than λ, at step 1540, one UE reports the value of ρ to the serving BS. At step 1550, BS selects one or more than one UEs from all the UEs that report the value of ρ. One example is that the BS sorts all the received ρ and the select one ore more than one UEs that have the largest ρ. Those chosen UEs are multi-cell UEs. The BS will schedule them to transmit SRS in the multi-cell SRS resource.

In some embodiments, the control message signaled by the BS includes periodicity information. The UE then measures and calculates the ratio as in 1520, 1530, 1540 periodically by following the periodicity indicated in the control message from BS.

In some embodiments, the UE also checks the MCS it can support in downlink in 1540 of FIG. 15. If the MCS the UE can support is larger than some MCS threshold, the UE does not report the ratio ρ to BS.

In some embodiments, the UE reports the indices of strongest non-serving BSs whose sum power contributes, for example, 90% to the total inter-cell interference power. The UE checks the MCS it can support in the downlink or the downlink SINK. If the MCS is lower than some threshold or if the downlink SINR is smaller than some threshold, the UE reports the indices of those BSs to its serving BS. The serving BS allocates one multi-cell SRS to this UE and inform the multi-cell SRS configuration information to the BSs that this UE reports.

In some embodiments, a BS signals a set of non-serving BS identifications to UEs and indicate UE to measure the RSRP of those non-serving BSs. A BS also signals the UE to measure the sum of signal power of all non-serving BSs. A UE reports the measured RSRP of those non-serving BSs and measured sum of the signal power of all non-serving BSs to the UE's serving BS.

In some embodiment of the current invention, a UE reports the sum of measured RSRP of those non-serving BSs and the measured sum of the signal power of all non-serving BSs to its serving BS. A BS calculates the ρ and select multi-cell UEs based on the value of ρ. In some embodiment, the BS reports some information on the time when the downlink data transmission will be transmitted to the multi-cell UEs and inform such information from one BS to one or more than one other BSs.

Figure 16:
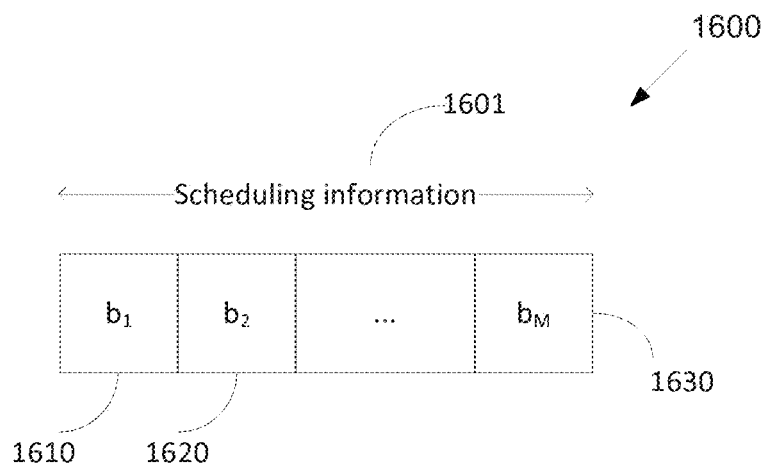
FIG. 16 illustrates an example bitmap scheduling information of multi-cell UEs according to embodiments of the present disclosure.

FIG. 16 illustrates an example bitmap scheduling information of multi-cell UEs 1600 according to embodiments of the present disclosure. The embodiment of the bitmap scheduling information of multi-cell UEs 1600 illustrated in FIG. 16 is for illustration only, and the bitmap scheduling information of multi-cell UEs 1600 of FIG. 16 could have the same or similar configuration. However, the bitmap scheduling information of multi-cell UEs 1600 comes in a wide variety of configurations, and FIG. 16 does not limit the scope of this disclosure to any particular implementation of the bitmap scheduling information of multi-cell UEs 1600.

Referring to FIG. 16, bitmap 1601 contains M bits, where the number of multi-cell UEs in one cell is M and the number of SRS transmission chance in the multi-cell SRS resource allocated to the BS is M. Each bit in 1601 corresponds to one SRS transmission chance in the multi-cell SRS resource. Referring to FIG. 16, bit 1610=1 indicates that the multi-cell UE sending SRS in the first SRS transmission chance may be scheduled in downlink data transmission during a particular period, and bit 1610=0 indicates that the corresponding UE will not be scheduled in downlink data transmission during a particular period. Bit 1620 corresponds to the multi-cell UE sending SRS in the second SRS transmission chance in the multi-cell SRS resource. Bit 1630 corresponds to the multi-cell UE sending SRS in the M-th SRS transmission chance in the multi-cell SRS resource allocated to the BS.

Figure 17:
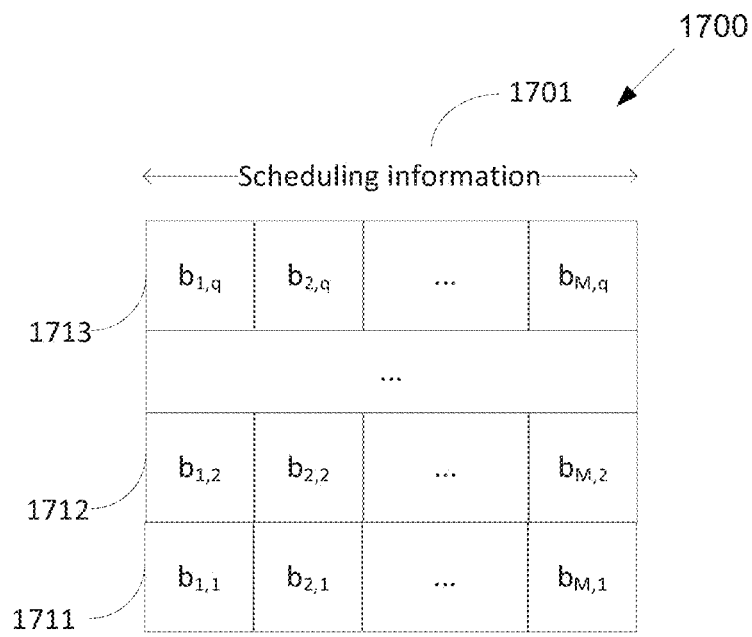
FIG. 17 illustrates another example bitmap scheduling information of multi-cell UEs according to embodiments of the present disclosure.

FIG. 17 illustrates another example bitmap scheduling information of multi-cell UEs 1700 according to embodiments of the present disclosure. The embodiment of the bitmap scheduling information of multi-cell UEs 1700 illustrated in FIG. 17 is for illustration only, and the bitmap scheduling information of multi-cell UEs 1700 of FIG. 17 could have the same or similar configuration. However, bitmap scheduling information of multi-cell UEs 1700 comes in a wide variety of configurations, and FIG. 17 does not limit the scope of this disclosure to any particular implementation of the bitmap scheduling information of multi-cell UEs 1700.

Referring to FIG. 17, bitmap 1701 contains M×q bits, where the number of multi-cell UEs in one cell is M and the number of subbands for downlink transmission is q. Bits $\{b_{m,1}, b_{m,2}, \ldots, b_{m,q}\}$ correspond to the multi-cell UE that sends SRS on the m-th transmission chance of multi-cell SRS resource allocated to the BS and each bit (e.g., 1711, 1712, 1713) in $\{b_{m,1}, b_{m,2}, \ldots, b_{m,q}\}$ corresponds to one subband for the corresponded UE. Referring to FIG. 16, $b_{1,1}=1$ indicates that the corresponding UE will be scheduled in the subband 1 for downlink data transmission during a particular period and $b_{1,1}=0$ indicates that the corresponding UE will not be scheduled in the subband 1 for downlink data transmission during a particular period. Referring to FIG. 16, $b_{1,2}=1$ indicates that the corresponding UE may be scheduled in the subband 2 for downlink data transmission during a particular period and $b_{1,2}=0$ indicates that the corresponding UE will not be scheduled in the subband 2 for downlink data transmission during a particular period.

In some embodiments, the BS reports the bitmap of scheduling information periodically with period T. Each bitmap the BS reports contains the scheduling information of multi-cell UEs for the next period T. In some embodiment of the current invention, one BS receives the bitmap of scheduling information of one or more other BSs. One BS can calculate its downlink precoding scheme based on the bitmap of other BSs. In one example, in the calculation of precoding for downlink transmission in period T, a BS only includes the channel measurement from the multi-cell SRS resources whose bits are 1 for the period T. For those multi-cell SRS resource whose corresponding bits are set to 0, one BS would not include channel measurement detected from them in its precoding weight calculation for the downlink transmission in the period T.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. An user equipment (UE) in a wireless communication system, the UE comprising:
a transceiver configured to receive, from a base station (BS), configuration information comprising a set of different transmission parameters for a sounding reference signal (SRS) for a multi-cell full dimension multi-input multi-output (MC FD-MIMO) system, wherein the set of different transmission parameters includes a type of cyclic prefix (CP) and a type of SRS; and
at least one processor configured to determine, based on the configuration information, whether the type of SRS is a MC-SRS type,
wherein the transceiver is further configured to transmit, based on the determination, to an aggressor BS, the SRS using the type of CP configured for the MC-SRS type over an MC-SRS resource configured by the BS.

2. The UE of claim 1, wherein:
the transceiver is further configured to receive a cell identification (ID) of the aggressor BS in the MC FD-MIMO system; and
the at least one processor is further configured to:
measure downlink timings and path loss based on downlink signals received from neighbor BSs and the aggressor BS in the MC FD-MIMO system;
calculate an average downlink timing of the measured downlink timings based on a predefined timing offset configured by the BS; and
adjust a timing advance based on the calculated average downlink timing and uplink transmit power based on the measured path loss and a configured power control offset to transmit the SRS.

3. The UE of claim 1, wherein:
the transceiver is further configured to receive a control message including at least one of a list of BSs, a threshold, and an indicator indicating an MC FD-MIMO operation; and
the at least one processor is further configured to:
measure total signal powers based on signals received from the BSs included in the list of BSs and non-serving BSs;
calculate a ratio of the measured total signal powers of the BSs included in the list of BSs and the non-serving BSs; and
compare the ratio of the measured total signal powers with the threshold included in the control message.

4. The UE of claim 3, wherein:
the at least one processor is further configured to determine a list of aggressor BSs interfering the UE based on the measured total signal powers from the BSs included in the list of BSs; and
the transceiver is further configured to transmit the list of aggressor BSs and the calculated ratio to the BS if the ratio is greater or equal to the threshold.

5. The UE of claim 1, wherein the configuration information comprises at least one of the type of SRS, an orthogonal frequency division multiplexing (OFDM) numerology, a length of cyclic prefix (CP), power control information, or a timing advance.

6. The UE of claim 1, wherein the transceiver is further configured to:
receive the configuration information comprising a UE-specific SRS configuration and an MC-SRS resource configuration; and
transmit the SRS based on the UE-specific RS configuration on at least one of a predetermined or the configured MC-SRS resources.

7. A base station (BS) in a wireless communication system, the BS comprising:
at least one processor configured to determine configuration information; and
a transceiver configured to:
transmit, to a user equipment (UE), the determined configuration information comprising a set of different transmission parameters for a sounding reference signal (SRS) for a multi-cell full dimension multi-input multi-output (MC FD-MIMO) system, wherein the set of different transmission parameters includes a type of cyclic prefix (CP) and a type of SRS;
wherein when the type of SRS is a MC-SRS type, the UE transmits, to an aggressor BS, the SRS using the type of CP configured for the MC-SRS type over an MC-SRS resource configured by the BS.

8. The BS of claim 7, wherein the transceiver is further configured to:
transmit cell identification (ID) of an aggressor BS in the MC FD-MIMO system; and
receive the SRS based on an adjusted timing advance in accordance with average downlink timings transmitted to the UE from neighbor BSs and the aggressor BS in the MC FD-MIMO system.

9. The BS of claim 7, wherein the transceiver is further configured to:
transmit a control message including at least one of a list of BSs, a threshold, and an indicator indicating an MC FD-MIMO operation; and
receive a list of aggressor BSs and a ratio based on measured total signal powers of signals transmitted from the BSs included in the list of BSs and non-serving BSs.

10. The BS of claim 7, wherein:
the at least one processor is further configured to determine type of SRS comprising at least one of an MC-SRS, a cell-specific SRS, or a UE specific SRS based on the type of SRS;
the transceiver is further configured to:
transmit a configuration of the determined type of SRS to the UE; and
receive channel state information (CSI) measured based on the configuration of the determined type of SRS.

11. The BS of claim 10, wherein the at least one processor is further configured to:
calculate an FD-MIMO precoder based on the received CSI using multi-cell signal to noise and leakage ratio (MC-SNLR) algorithm; and
determine the FD-MIMO precoder to be used for transmitting a physical downlink shared channel (PDSCH) to the UE.

12. The BS of claim 7, wherein:
the at least one processor is further configured to coordinate at least one neighbor BS to determine a cell-specific SRS configuration including at least one subframe in common use; and
the transceiver is further configured to transmit the cell-specific SRS to at least one UE in a cell.

13. The BS of claim 7, wherein the at least one processor is further configured to:
receive, from a network node, information to mitigate interference on the MC-SRS resource; and
allocate the MC-SRS resource to at least one UE in a cell.

14. The BS of claim 7, wherein the configuration information comprises at least one of the type of SRS, an orthogonal frequency division multiplexing (OFDM) numerology, a length of cyclic prefix (CP), power control information, or a timing advance.

15. A method for interference reduction of a user equipment (UE) in a wireless communication system, the method comprising:
receiving, from a base station (BS), configuration information comprising a set of different transmission parameters for a sounding reference signal (SRS) for a multi-cell full dimension multi-input multi-output (MC FD-MIMO) system, wherein the set of different transmission parameters includes a type of cyclic prefix (CP) and a type of SRS;
determining, based on configuration information, whether the type of SRS is a MC-SRS type; and
transmitting, based on the determination, to an aggressor BS, the SRS using the type of CP configured for the MC-SRS type over an MC-SRS resource configured by the BS.

16. The method of claim 15, further comprising:
receiving a cell identification (ID) of the aggressor BS in the MC FD-MIMO system;
measuring downlink timings based on downlink signals received from neighbor BSs and the aggressor BS in the MC FD-MIMO system;
calculating an average downlink timing of the measured downlink timings based on a predefined timing offset configured by the BS and a path loss based on signal received from the aggressor BS; and
adjusting a timing advance based on the calculated average downlink timing and a uplink transmit power based on at least one of a predefined or a configured power control offset to transmit the SRS.

17. The method of claim 15, further comprising:
receiving a control message including at least one of a list of BSs, a threshold, and an indicator indicating an MC FD-MIMO operation;
measuring total signal powers based on signals received from the BSs included in the list of BSs and non-serving BSs;
calculating a ratio of the total signal powers of the BSs included in the list of BSs and the non-serving BSs; and
comparing the ratio of the measured total signal powers with the threshold included in the control message.

18. The method of claim 17, further comprising:
determining a list of aggressor BSs interfering the UE based on the measured total signal powers from the BSs included in the list of BSs; and
transmitting the list of aggressor BSs and the calculated ratio to the BS if the ratio is greater or equal to the threshold.

19. The method of claim 15, wherein the configuration information comprises at least one of the type of SRS, an orthogonal frequency division multiplexing (OFDM) numerology, a length of cyclic prefix (CP), power control information, or a timing advance.

20. The method of claim 15, further comprising:
receiving the configuration information comprising a UE-specific SRS configuration; and
transmitting the SRS based on the UE-specific RS configuration on at least one of a predetermined or the configured MC-SRS resources.

* * * * *